No. 846,984. PATENTED MAR. 12, 1907.
G. DIETZ.
PHOTOGRAPHIC SHUTTER.
APPLICATION FILED MAR. 7, 1906.
3 SHEETS—SHEET 1.
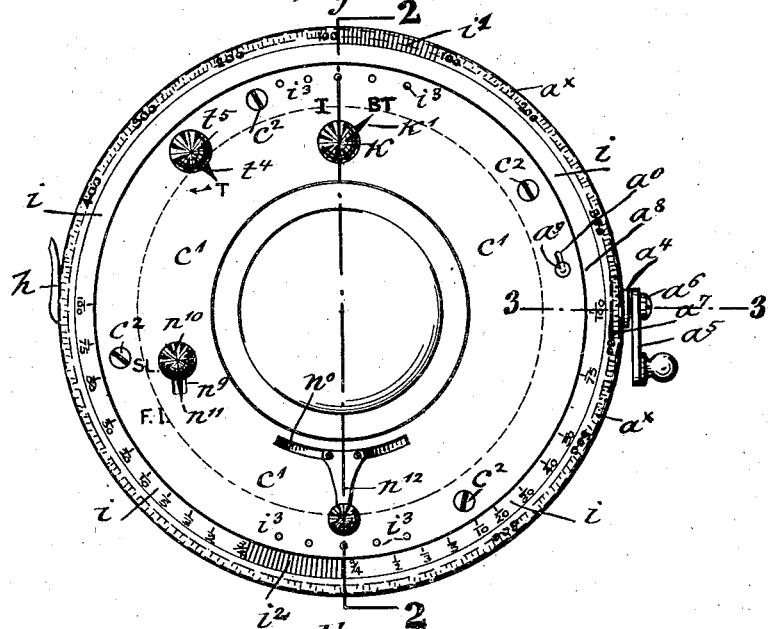
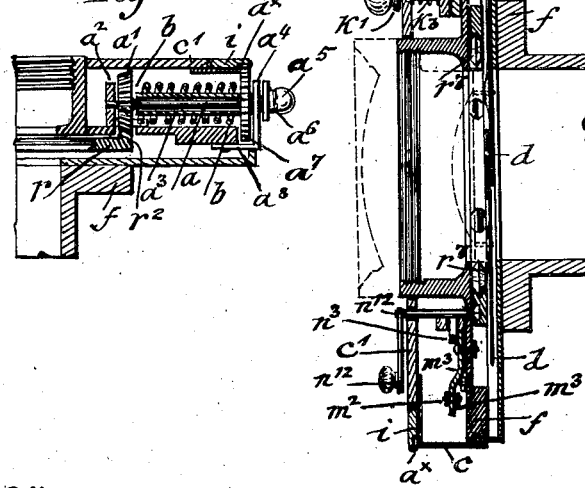
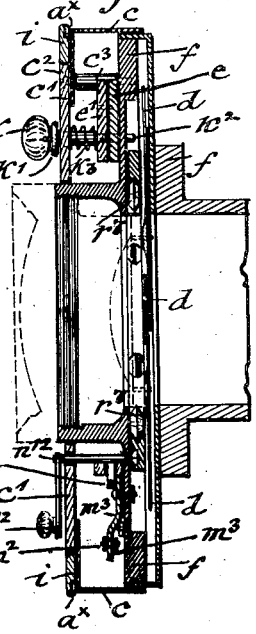
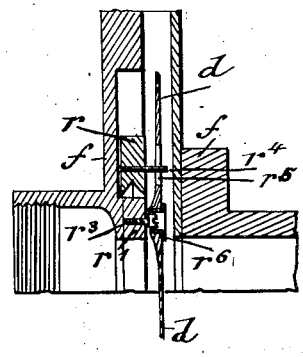
Witnesses
Fannie Fish
Henry J. Suberkier
Inventor
Gustav Dietz
By his Attorneys
Goulen Goepel

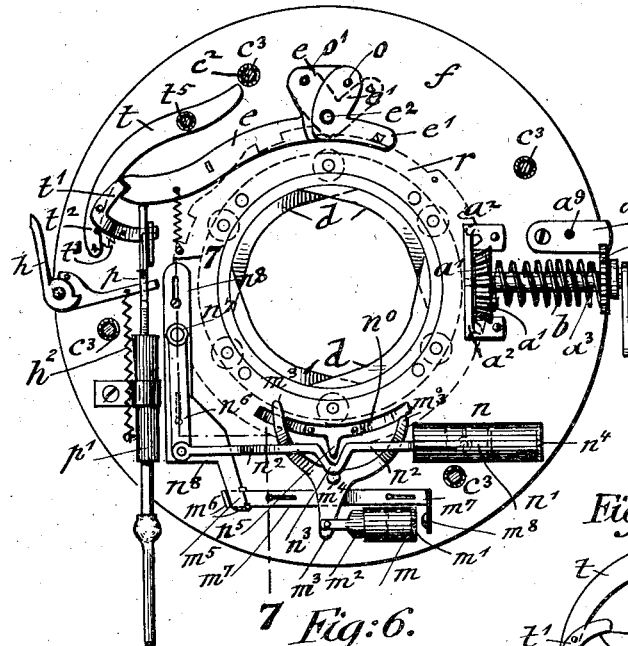
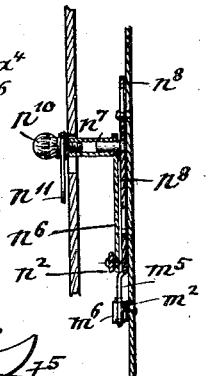
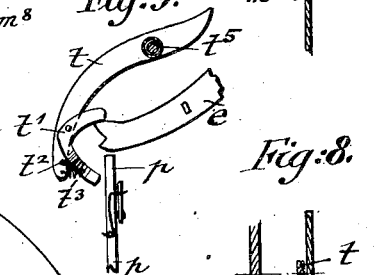
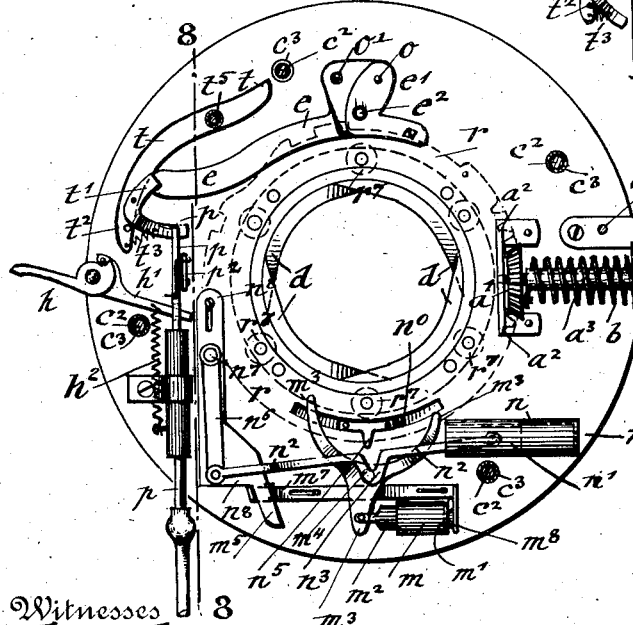
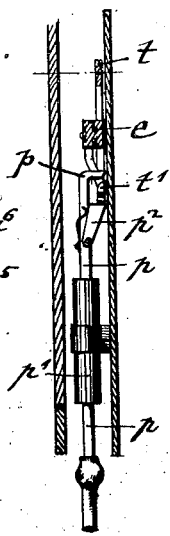

No. 846,984. PATENTED MAR. 12, 1907.
G. DIETZ.
PHOTOGRAPHIC SHUTTER.
APPLICATION FILED MAR. 7, 1906.
3 SHEETS—SHEET 3.
Fig: 10.
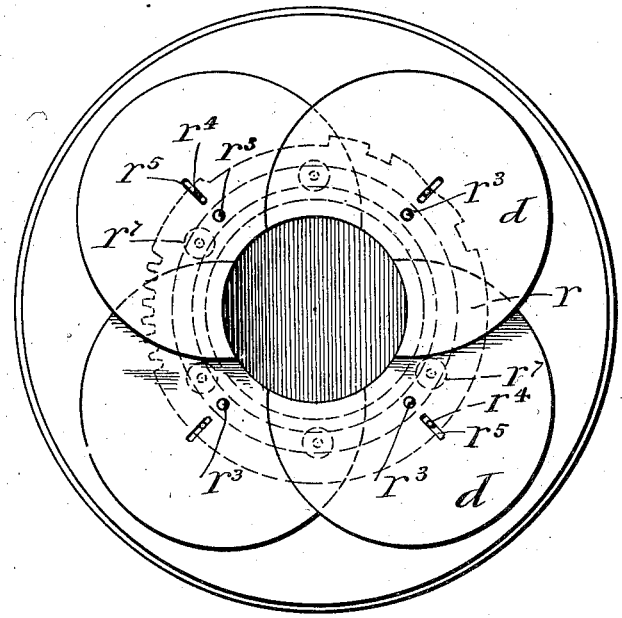
Fig: 11.
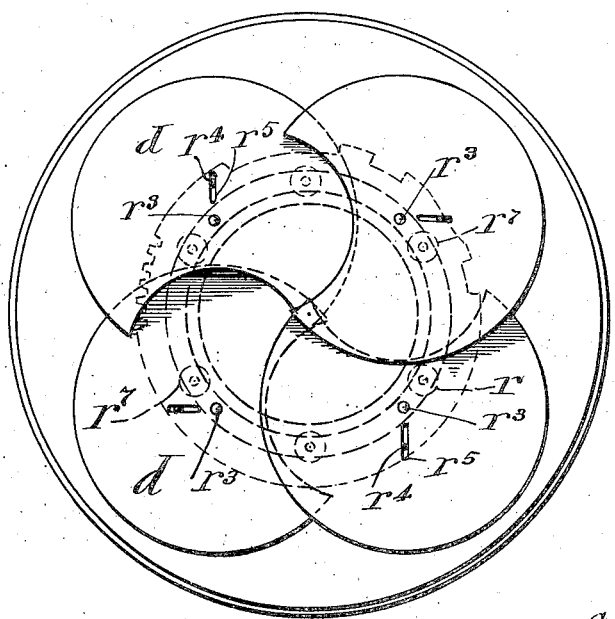
Witnesses
Fannie Fisk
H. J. Suhrbier
Inventor
Gustav Dietz
By his Attorneys
Goepel Goepel

UNITED STATES PATENT OFFICE.

GUSTAV DIETZ, OF YONKERS, NEW YORK.

PHOTOGRAPHIC SHUTTER.

No. 846,984.  Specification of Letters Patent.  Patented March 12, 1907.

Application filed March 7, 1906. Serial No. 304,612.

*To all whom it may concern:*

Be it known that I, GUSTAV DIETZ, a citizen of the United States, residing in Yonkers, in the county of Westchester and State of New York, have invented certain new and useful Improvements in Photographic Shutters, of which the following is a specification.

This invention relates to certain improvements in the photographic shutter for which I was granted Letters Patent No. 827,513 on July 31, 1906. This shutter was mainly designed for the use of professional photographers and advanced amateur photographers. For the purpose of rendering it more useful for the larger number of less practiced amateurs and adapting it for smaller-sized cameras, kodaks, &c., it was found necessary to inclose the operating mechanism of the shutter by a dust proof-cover and to arrange a visual speed-indicator; and for this purpose the invention consists of a photographic shutter provided with a dust-cover of special construction.

It consists, further, of a visual speed-indicator that is arranged concentrically with the dust-cover; and it consists, lastly, of certain details of construction by which the operating parts of the shutter can be set and adjusted cfrom the outside of the dust-cover, as will be fully described hereinafter and finally pointed out in the claims.

In the accompanying drawings, Figure 1 represents a front elevation of my improved photographic shutter, showing the arrangement of the dust-cover and speed-indicating ring. Fig. 2 is a vertical transverse section on line 2 2, Fig. 1. Fig. 3 is a detail horizontal section through the driving mechanism on line 3 3, Fig. 1, showing the connection with the speed-indicating ring. Fig. 4 is a detail section through the fly-operating mechanism. Figs. 5 and 6 are front elevations of the shutter with the dust-cover removed, showing the parts in position with the retarding device moved in and out of connection, respectively, with the driving-ring. Fig. 7 is a detail vertical transverse section on line 7 7, Fig. 5, drawn on a larger scale. Fig. 8 is a detail vertical transverse section on line 8 8, Fig. 6, showing the release mechanism set for time exposure. Fig. 9 is a detail front elevation of the release mechanism shown in released position; and Figs. 10 and 11 are rear elevations of the shutter, showing the files in open and closed position, respectively.

Similar letters of reference indicate corresponding parts in the different figures of the drawings.

Referring to the drawings, $f$ represents the ring-shaped case of a so-called "between-lens shutter." On a ring-shabed guide-shoulder $r'$ of the case is guided a driving-ring $r$. To this ring rotary motion is imparted around the case by means of a driving mechanism, which is arranged at one side of the case $f$ and which consists of an interior steel axle $a$, which carries at its inner end a bevel gear-wheel $a'$, the projecting end of the axle $a$ turning in journal-bearings of a bracket $a^2$, attached to the ring-shaped case $f$. The steel axle $a$ is supported in a brass tube $a^3$, which is open at the inner end and which is supported at its opposite end in journal-bearings of a bracket $a^4$. To the outer end of the brass tube $a^3$ is attached a hand-crank $a^5$ by a screw $a^6$ The brass tube $a^3$ carries, adjacent to the bracket $a^4$, a ratchet-wheel $a^7$, which is engaged by a pawl $a^8$, pivoted to the ring-shaped case of the shutter, said pawl $a^8$ carrying a handle $a^9$ for permitting the lifting of the pawl out of the teeth of the ratchet-wheel or lowering it into engagement with the same. The hand-crank $a^5$ and the ratchet-wheel $a^7$ can be turned in either direction. Around the brass tube $a^3$ is arranged a helical spring $b$, which is attached at one end to the bevel gear-wheel $a'$ and at its opposite end to the ratchet-wheel $a^7$, so that when the hand-crank $a^5$ is turned in either direction the helical spring $b$ is set to tension—or, in other words, power is stored up in the same, which power is used as the driving force for the movement of the shutter-driving ring. As soon as the spring $b$ is set to torsional tension the pawl $a^8$ is dropped into the teeth of the ratchet-wheel $a^7$, so that thereby the pawl-and-ratchet mechanism and the brass tube $a^3$ are locked in position and the full tension of the spring exerted on the bevel gear-wheel and the parts driven thereby as soon as this action is required. The bevel gear-wheel $a'$ is placed in mesh with the driving-ring $r$, which is guided around the ring-shaped guide-shoulder $r'$, to which the front lens is applied. The movable driving-ring $r$ is provided for a certain distance of its circumference with teeth $r^2$, that are in mesh with the bevel gear-wheel', the toothed portion being of sufficient length so as to permit the required shifting motion to be imparted to the driving-ring $r$ in either direction for properly working the shutter. The guide-shoulder $r'$ is provided with four steel pivots $r^3$, to which the flies $d$ of the shutter, of which four are arranged, are applied so that they turn on the pivots. The driving-ring $r$ has four steel pins $r^4$, which engage slots $r^5$, arranged in the flies so as to operate the same, as shown in Figs. 4, 10, and 11. The steel pivots $r^3$ are at the centers of the rotary flies and are evenly spaced around the opening in the shutter-case, said flies being rotated in the same direction for the opening movement as well as for the closing movement. The flies are preferably made of thin plates of celluloid, which are increased in thickness at their center and cemented to brass bushings $r^6$, the thickened or reinforced parts giving the flies the required strength for resisting the strain to which they are exposed in starting or stopping.

In order to reduce the friction between the driving-ring and the shoulder $r'$, the latter is provided with a number of small steel rollers $r^7$, preferably six, upon which the driving-ring bears.

A dust-cover $c\ c'$ is fitted to the front portion of the shutter-case. It consists of a circumferential cap $c$, of rectangular cross-section, and a front plate $c'$, which extends over the front portion of the cap $c$, both being connected by four screws $c^2$ to the shutter-case and held in proper position by stay-sleeves $c^3$, placed around said screws. By the cover the operating parts of the shutter are entirely inclosed, so as to prevent the settling of dust in and casual injury to the operating parts, especially when the shutter is used for outside work.

Around the circumference of the front plate $c'$ and resting against the front portion of the angular cap $c$ is arranged a speed-indicating ring $i$, which is provided with a circumferential gear $a^x$, that meshes with the ratchet-wheel $a^7$ and follows the motion of the same in both directions, according as the hand-crank $a^5$ is turned in one or the opposite direction, said ring indicating thereby visually the exact tension of the fly-operating spring. The speed-indicating ring $i$ is graduated, the speeds of the fast exposures from one one-hundredth to one six-hundredth part of a second being marked on the upper half and extending from the central neutral space $i'$ of the speed-indicating ring in both directions, to the left and the right. The neutral space is determined by the movement of the spring and speed-indicating ring from one closed position of the shutter to the other closed position, as this is the lowest tension for throwing the flies over. On the opposite lower side of the speed-indicating ring are marked the speeds for a retarding device, also to the left and right of a second neutral space $i^2$, from three-fourths to one one-hundredth of a second. To correct the changes of the spring tension that may vary from different causes, there are five stationary guide-points $i^3$ marked on the front plate $c'$ opposite the neutral parts of the ring. Exposures up to one four-hundredth part of a second can be made by turning the coil-spring in either direction, which keeps the steel spring always in average tension. For faster exposures, up to one six-hundredth and over, the speed-indicating ring when the spring has been working in one direction successively will not assume the same position, as the tension of the actuating-spring is bound to lose some of its power. In this case not the first but one of the other of the five guide-points $i^3$ is the guide-mark. After the spring has rested for some time in opposite tension it will bring the speed-indicating ring back to its normal position. The knob or handle $a^9$ of the pawl $a^8$ that is used in connection with the ratchet-wheel $a^7$ passes through a short slot $a^0$ in the front plate, so as to permit the lifting of the pawl $a^8$ out of engagement with the ratchet-wheel or the dropping back into the same, as required for setting the driving-spring to tension. The speed-indicating ring $i$ being worked in connection with the ratchet-wheel $a^7$ and driving-spring $b$ gives especially to less practiced photographers and amateurs a visual indication of the tension at which the shutter is working and to which it is to be set.

The escapement mechanism by which the driving-ring $r$ is engaged or released consists of two elbow-levers $e\ e'$, which are both pivoted to a fulcrum-pin $e^2$ on the upper part of the ring-shaped case $f$, the elbow-lever $e$ being of greater length than the elbow-lever $e'$. The shorter elbow-lever $e'$ is set by a knob $k$, having a pointer $k'$ and fastened to a small steel shaft $k^2$, which is screwed into the short elbow-lever for bulb exposures, said shaft extending through holes in the longer elbow-lever and shutter-case proper. The shorter elbow-lever $e'$ is pressed against the end of the longer elbow-lever by a helical spring $k^3$, which is placed on the shaft $k^2$ and interposed between the front plate of the cover and the shorter elbow-lever, as shown in Fig. 2. For changing the short elbow-lever $e'$ from instantaneous to bulb exposures, and vice versa, the knob $k$ is lifted with the short elbow-lever $e'$, so that a pin $o$ on the same is lifted out of the pin-hole in the longer elbow-lever, after which the knob and elbow-lever $e'$ are turned and the pin $o$ dropped into a second pin-hole $o'$ on the longer elbow-lever, the pointer $k'$ being moved at the same time from the point marked I on the front plate to the point BT. The longer elbow-lever $e$ is actuated either by means of a piston-rod $p$, whose piston is guided in a cylinder $p'$ and operated by an air-bulb or by a flexible wire-release or by means of a hand-lever $h$ $h'$, which is arranged sidewise of the piston-rod, as shown in Figs. 5 and 6. The lever $h$ $h'$ is used when it is not desired to use the bulb, the part $h'$ of said lever engaging the piston-rod and acting to lift the same when the part $h$ is depressed. The part $h'$ is normally held in downward position by a spring $h^2$. The part $h$ may be folded upwardly, as shown in Fig. 5. The piston-rod $p$ has a short spring-actuated push-lever $p^2$, as shown in Fig. 8, which is pivoted to the side of the same and which serves for engaging a small elbow-lever $t'$, that is fulcrumed to a longer time-lever $t$ and held normally against a stop-pin $t^2$ on the same by a spring $t^3$.

For time exposures the longer elbow-lever $e$ is set for bulb exposures and held in engagement with the driving-ring through the lever arrangement $t$ $t'$. The longer lever $t$ is disengaged when the pointer $t^4$ of its knob $t^5$, connected to the same, is moved away from the mark T on the front plate of the cover. By turning the knob and pointer to the mark T the lever $t$ is moved toward the longer escapement-lever $e$ and brings the small elbow-lever $t'$ over the recessed end of the escapement-lever $e$, as shown in Fig. 9. When the escapement-lever $e$ is lifted by the piston-rod $p$, the upper arm of the elbow-lever $t'$ is pushed up and dropped into the recessed end of the escapement-lever and holds the same in raised position. The lower arm of the elbow-lever $t'$ is pushed by the lifting of the upper arm under the piston-rod $p$ and over the small push-lever $p^2$. By pushing the piston-rod in upward direction for the second time the push-lever $p^2$ pushes the lower arm of the elbow-lever $t'$ up and disengages at the same time the upper arm from the escapement-lever, so that the latter drops down and permits the release of the driving-ring and the closing of the shutter.

For slow instantaneous exposures a retarding device is necessary, which at the same time renders the operation of the shutter noiseless. The retarding device consists of a cylinder $n$, attached to the frame of the shutter-case, with an air-hole $n^4$ in the end of the cylinder. The piston $n'$, sliding in the cylinder, is pivoted to a piston-rod $n^2$, and the piston-rod provided with a V-shaped bend $n^3$ at about its center for receiving a finger $n^5$, connected to the driving-ring $r$. The opposite end of the piston-rod $n^2$ is pivoted to the lower end of a link $n^6$, which is pivoted at its upper end to a pin $n^7$ on a vertically-guided plate $n^8$, a sleeve being placed over the pin and extended through a slot $n^9$ in the front plate of the cover and provided with a knob $n^{10}$ and pointer $n^{11}$, by which the adjustment of the retarding device is effected from slow to fast instantaneous exposure, and vice versa. The finger $n^5$ is guided in an arc-shaped slot $n^0$ in the case $f$. To connect the retarding device with the finger $n^5$ on the driving-ring $r$, the knob $n^{10}$ is turned till the pointer $n^{11}$ stands parallel with an exterior handle $n^{12}$ on the finger $n^5$ on the driving-ring. The knob $n^{10}$ is then pushed up with the guide-plate $n^8$, which will bring the V-shaped bend in the piston-rod $n^2$ of the retarding device over the finger $n^5$ on the driving-ring, as shown in Fig. 5. For disconnecting the retarding device the knob $n^{10}$ and guide-plate $n^8$ are pushed down, which action moves the piston-rod $n^2$ in downward direction and releases the V-shaped bend from the finger $n^5$ on the driving-ring, as shown in Fig. 6.

An air-check for cushioning the high speeds of the driving-ring is arranged at the lower part of the front plate of the cover below the retarding device and is composed of a cylinder $m$, having a large opening $m'$ in its head. The piston $m^2$ of the air-check is pivoted to the lower end of a forked lever $m^3$, which is fulcrumed at $m^4$ to the case. One or the other of the arms of the forked lever $m^3$ is struck by the finger $m^5$ on the driving-ring at the moment when the flies close and retards thereby the completion of the movement of the driving-ring for high speeds either by compression or suction. The lower end of the vertical guide-plate $n^8$ has an arm $m^5$, slanting in downward direction, which arm is guided along inclined guides or keepers $m^6$ on a horizontally-guided slide-rod $m^7$, to the opposite end of which is applied a soft-rubber button $m^8$, which serves to open or close the air-opening in the head of the air-check cylinder, closing the opening when the guide-plate $n^8$ is pushed down and opening it when the guide-plate is moved up, and placing thereby the retarding device simultaneously in or out of action, as shown, respectively, in Figs. 5 and 6.

The operation of the improved shutter is as follows: The speeds are divided into high-instantaneous, retarded-instantaneous, bulb, and time exposure. For high-instantaneous speeds the driving-ring for operating the flies is unimpeded and turns very quickly about the guide-shoulder in either direction. The lowest tension at which the motor-spring will operate the shutter is produced by one-half turn of the spring, and when the spring has been turned three and one-half times the highest tension of the spring is reached. The exposure speeds of course increase in ratio to the turns of the spring. Throughout all high speeds the pneumatic check is closed and the driving-ring is cushioned at the end of each exposure. For slow-instantaneous exposures the retarding device is connected to the driving-ring by operating the knob $n^{10}$, as hereinbefore described. This action at the same time opens the pneumatic check, which is not necessary for slow speeds. The retarding action is caused by the air slowly filling the cylinder and being slowly expelled through the opening therein. The speeds of these exposures may of course be varied by increasing or decreasing the tension of the motor-spring. If the piston of the retarding-cylinder is connected to the driving-ring, the action of the shutter is absolutely noiseless. It is also noiseless when through the knob $k$ the short elbow-lever $e'$ is set for bulb exposures or through turning the knob $t^5$ the time-stop lever is brought close to the escapement-lever for time exposures. In these cases the driving-ring, with the flies, moves slowly and noiselessly until the driving-ring is arrested by the engagement of its tooth with the short elbow-lever $e'$ and completes the movement slowly and noiselessly, when the stop-tooth of the driving-ring is released. These bulb and time exposures are quick-acting without the retarding device, but are accompanied by the click of the metal. Since the speed-indicating ring travels in either direction, according to the tension of the motor-spring, the exposure speeds as shown on the speed-indicating ring are absolutely correct, and vice versa the spring may be put to the tension required, as indicated by said indicating-ring.

Having thus described my invention, I claim as new and desire to secure by Letters Patent—

1. In a photographic shutter, the combination, with a spring-actuated driving mechanism for the flies, of a speed-indicating ring arranged circumferentially around the shutter, and an operative connection between said driving mechanism and said indicating-ring, whereby the latter is moved in either direction by the former.

2. In a photographic shutter, the combination, with a driving mechanism for the flies including a motor-spring, of a speed-indicating ring, and an operative connection between said motor-spring and said indicating-ring, whereby the latter is moved in the same direction and in the same ratio as the former.

3. In a photographic shutter, the combination, with the shutter-case, of a driving mechanism for the flies including a ratchet-wheel, and a speed-indicating ring geared to said ratchet-wheel and provided with speed-indicating graduations.

4. In a photographic shutter, the combination, with the escapement mechanism, and the mechanism for driving the flies, of a time-lever fulcrumed to the case, and an elbow-lever fulcrumed to said time-lever and adapted to be thrown into engagement with the escapement mechanism.

5. In a photographic shutter, the combination, with the escapement mechanism, and the fly-driving mechanism, of a time-lever, an elbow-lever fulcrumed to the same, and means for setting the time-lever for placing the elbow-lever in or out of engagement with the escapement mechanism.

6. In a photographic shutter, the combination, with the driving-ring for the flies provided with a finger extension, of a retarding device, and means for throwing the retarding device in or out of engagement with the finger extension.

7. In a photographic shutter, the combination, with the driving-ring for the flies, of a forked lever fulcrumed to the case, an air-check connected with the forked lever, and means for opening or closing the air-check.

8. In a photographic shutter, the combination, with the driving-ring for the flies, of a retarding device, an air-check, and an automatic connection between said retarding device and air-check.

9. In a photographic shutter, the combination, with the driving-ring provided with a finger extension, of a retarding device, and an automatically-operated air-check, said air-check being closed when the retarding device is disconnected, and opened when the retarding device is connected with the finger extension of the driving-ring.

10. In a photographic shutter, the combination, with the driving-ring for the flies, of a retarding device, and means for connecting said retarding device to said driving-ring throughout the movement of the latter, whereby said driving-ring is retarded evenly throughout such movement.

In testimony that I claim the foregoing as my invention I have signed my name in presence of two subscribing witnesses.

GUSTAV DIETZ.

Witnesses:
PAUL GOEPEL,
HENRY J. SUHRBIER.